3,523,098
POLYAMIC ACID COMPOSITIONS CONTAINING SMOOTHNESS ADDITIVES
Fred F. Holub, Scotia, and Donald L. Reinhard, Albany, N.Y., assignors to General Electric Company, a corporation of New York
No Drawing. Continuation-in-part of application Ser. No. 547,772, May 5, 1966. This application May 26, 1969, Ser. No. 828,005
Int. Cl. C08g 51/44, 51/34
U.S. Cl. 260—33.4    7 Claims

ABSTRACT OF THE DISCLOSURE

Polyamic acid coating compositions which provide smooth, cured coatings are prepared by adding to the composition from about 1 to 15% of particular tertiary amine type additives based on the weight of the wire enamel solvent.

---

This application is a continuation-in-part of application Ser. No. 547,772, filed May 5, 1966, assigned to the same assignee as this application and now abandoned.

This invention relates to new and useful compositions of matter. More particularly, it relates to polyamic acid compositions which are dissolved in relatively inexpensive solvents which, by reason of certain additives, provide smooth, uniform, electrical insulating and protective coatings containing imide groups in the cured state.

It is well known to those skilled in the art that aromatic dianhydrides and aromatic diamines react under suitable conditions in polar organic solvents to yield high molecular weight, soluble intermediates which can be further converted by heat to insoluble, infusible polymers having good thermal stability. Such polymers are described, for example, in many U.S. patents, including, among others, 3,179,614; 3,179,630; 3,179,633; 3,179,634; 3,179,635 and 3,190,856. The highly aromatic nature of the starting materials for such compositions generally requires the use of relatively expensive solvents, such as N,N-dimethyl formamide, N-methyl-2-pyrrolidone, and N,N-dimethyl acetamide and the like in the preparation of wire enamels from the compositions. Various efforts have been discussed in the prior art with the end in view of preparing polyamic acids in lower cost solvents such as cresol and the like. Among such prior art efforts is that described in Indian Patent 90,892 wherein a tertiary amine such as pyridine is used in conjunction with a cresol solvent in the preparation of a wire enamel. However, it has been found that when such materials are used as coating materials for electrical conductors and the like, the resultant coatings are not acceptable because of their roughness and non-uniformity. Enameled conductors which are non-uniform and have a rough surface cannot be handled by automatic winding equipment since surface damage readily occurs during this operation.

From the above it will be quite evident that there is a need for polyamic acid materials which in solution or enamel form in inexpensive solvents can be used to provide smooth and uniform coatings for base structures such as electrical conductors and the like, and it is a primary object of the present invention to provide such compositions.

Briefly, the present invention relates to polyamic acid materials which are prepared as by reacting in a suitable solvent, dianhydride and a diamine, there being added to the material as described hereinafter tertiary amine material as set forth hereinafter containing hydroxyl groups or ester groups, or both hydroxyl and ester groups, or mixtures of such amines, such tertiary amine material having boiling points above 180° C., preferably ranging from 180° C. to about 360° C., and most preferably from about 240° C. to about 260° C., all at atmospheric pressure, to provide polymer solutions using relatively inexpensive solvents such as cresol and the like, including cresylic acid, called hereafter cresol, as well as phenol and mixtures of cresol and phenol, which have good shelf life and which when applied to base structures such as electrical conductors afford smooth, uniform, continuous coatings useful as electrical insulation and other protective purposes.

In certain instances an ammonium compound may be added as a viscosity controlling agent. Such ammonium compounds are of the class of ammonia or ammonium salts of organic monocarboxylic acids of the formula (I)    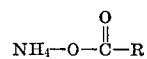

where R is a monovalent hydrocarbon radical (e.g., alkyl, aryl, alkaryl, and aralkyl), such as ammonium formate, ammonium acetate, ammonium propionate, ammonium butyrate, ammonium benzoate, etc.

The invention also applies to polyamic acids which may have been prepared in more expensive solvents but which after preparation are dissolved in the present solvents along with additives as taught.

Those features of the invention which are believed to be novel are set forth with particularity in the claims appended hereto. The invention will, however, be better understood from a consideration of the following description.

The tertiary amines containing hydroxyl or alcohol groups or acetate groups, or both, can be expressed as follows:

(II)    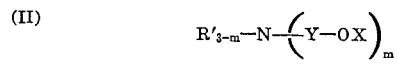

where $m$ ranges from one to three, Y is an alkylene radical having at least two and up to five carbon atoms, R' is alkyl, alkaryl, aralkyl and aryl, X is

or H and R" is hydrogen, alkyl, alkaryl, aralkyl and aryl, or (III)    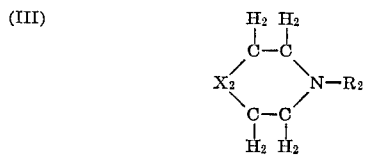

where $X_2$ is

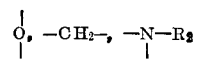

and $R_2$ is

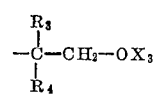

where $X_3$ is the same as X, where $R_3$ is hydrogen, alkyl, aryl, alkaryl or aralkyl, and $R_4$ has the same meaning as $R_3$, or a member selected from the group consisting of N-methyldiethanolamine, triethanolamine, N,N-phenylmethylethanolamine, N-t-butyldiethanolamine, N-butyldiethanolamine, N-phenyldiethanolamine, N,N-phenylethylethanolamine and their acetates and mixtures thereof, and mixtures of the materials of Formula II, Formula III including those listed specifically above. Where there are multiple occurrences of any group, these may be the same or different within the above definitions. Mixtures of such amines can be used. It has been found that tertiary amine material of the above types do not provide smooth coatings if their boiling point is under 180° C. or outside the range prescribed.

Generally speaking, from about 1 to 15 percent of the particular tertiary amine based on the weight of the solvent is used, the optimum concentration being about 3 percent. All percentages and parts or proportions expressed herein, except where otherwise specifically stated, are by weight. It has been found that if less than about 1 percent of the additive is used, no useful properties such as smoothness and evenness of coating, lack of blistering, and the like result. On the other hand, if over about 15 percent is used, properties such as cut-through and thermal resistance begin to deteriorate. Such higher amounts of additive also unduly lengthen the cure time and are economically impractical.

The dianhydrides useful in connection with the present invention can be expressed by the formula (IV) 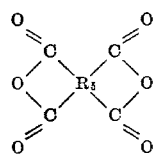

where $R_5$ is a tetravalent organic radical containing at least two carbon atoms selected from substituted and unsubstituted aliphatic, cycloaliphatic, heterocyclic, aromatic and combinations of such groups. Among the anhydrides useful in this connection are pyromellitic dianhydride, 2,3,6,7-naphthalene tetracarboxylic dianhydride,
3,3',4,4'-diphenyl tetracarboxylic dianhydride,
1,2,5,6-naphthalene tetracarboxylic dianhydride,
2,2',3,3'-diphenyl tetracarboxylic dianhydride,
2,2-bis(3,4-dicarboxyphenyl)propane dianhydride,
bis(3,4-dicarboxyphenyl)sulfone dianhydride,
perylene 3,4,9,10-tetracarboxylic acid dianhydride,
bis(3,4-dicarboxyphenyl)ether dianhydride,
naphthalene—1,2,4,5-tetracarboxylic dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride,
benzene-1,2,3,4-tetracarboxylic dianhydride,
pyrazine-2,3,5,6-tetracarboxylic dianhydride,
thiophene-2,3,4,5-tetracarboxylic dianhydride,
3,3',4,4'-benzophenone tetracarboxylic dianhydride,
ethylene bis-(anhydrotrimellitate)

and the trimellitic acid derivatives set forth in Pats. 3,182,073 and 3,182,074. Also useful are various aliphatic dianhydrides of which 1,2,3,4-butane tetracarboxylic dianhydride is exemplary. Mixtures of the above anhydrides may also be used.

The diamines useful in the present connection can be expressed by the formula (V) $\qquad H_2N\text{—}R_6\text{—}NH_2$ where $R_6$ is a divalent organic group containing at least two carbon atoms, the two amine radicals being attached to separate carbon atoms of the divalent group. The diamines useful in the present invention include, among others, meta-phenylene diamine;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl)diethyl silane;
bis-(4-amino-phenyl)phosphine oxide;
bis-(4-aminophenyl)-N-methylamine;
1,5-diamino-naphthalene;
3,3'-dimethyl-4,4'-diamino-biphenyl;
3,3'-dimethoxy benzidine;
2,4-bis-(beta-amino-butyl)toluene;
bis-(para-beta-amino-t-butyl-phenyl)ether;
para-bia-(2-methyl-4-amino-pentyl)benzene;
para-bis-(1,1-dimethyl-5-amino-pentyl)benzene;
m-xylylene diamine;
p-xylene diamine;
ethylene diamine;
hexamethylene diamine;
propylene diamine;
and mixtures thereof.

The present materials can be prepared in a variety of ways as set forth below, it being appreciated that in the methods set forth, various other materials of the categories described can be substituted as above, the methods described being specific to the examples as noted wherein the amounts of reactants are given.

METHOD 1

Powered benzophenone tetracarboxylic dianhydride (BPDA) was slowly added to a solution of methylene dianiline (MDA) and cresol at room temperature with stirring. Within from about ¼ to ½ hour the reactant contents became cloudy and precipitation of polyamide-acid occurred. After one to two days' standing at room temperature, the insolublue polymer was dissolved completely in the cresol solvent. At this point the tertiary amine was stirred into the polymer solution.

METHOD 2

Powdered benzophenone tetracarboxylic dianhydride (BPDA) was slowly added to a solution of methylene dianiline (MDA), ammonium acetate and cresol at room temperature over a period of from one to two hours. No precipitation occurred so long as the ammonium acetate to BPDA mole ratio was at least 1. The smoothness additive was added later.

METHOD 3

Into a solution of methylene dianiline, the tertiary amine smoothness additive and cresol, there was added with stirring at room temperature benzophenone tetracarboxylic dianhydride. In some cases when the smoothness additive was less than 2 percent of the solvent system, precipitation occurred within about one to two hours. However, the precipitant redissolved after standing at room temperature for about eight hours.

METHOD 4

A solution of benzophenone tetracarboxylic dianhydride and ammonium acetate in cresol was added to a solution of methylene dianiline and cresol and the contents stirred at room temperature. The smoothness additive was added from about one to two days later. Polymers prepared in this manner had a low initial solution viscosity of less than 5000 cps. at 25° C. as compared to the usual 20,000–40,000 cps. When the mole ratio of ammonium acetate to BPDA was 2, the solution viscosities ranged between about 1,000 to 2,000 cps.

METHOD 5

A solution of benzophenone tetracarboxylic dianhydride in cresol was added to a solution of methylene dianiline, ammonium acetate and cresol with stirring at room temperature to provide solutions having initial viscosities ranging between 20,000 and 40,000 cps. After standing for three to four weeks at room temperature, the solution viscosities dropped to as low as 4,000 to 5,000 cps. and the smoothness additives were stirred into the polymer solution after this three- to four-week period.

METHOD 6

Benzophenone tetracarboxylic dianhydride was slowly added to a solution of methylene dianiline in cresol at room temperature. When the solution became cloudy due to the precipitation of polyamide acid, the smoothness additive was slowly added, the entire solution becoming clear within a few minutes with no further precipitation.

METHOD 7

A solution of benzophenone tetracarboxylic dianhydride, tertiary amine smoothness additive and cresol was added to a solution of cresol and methylene dianiline at room temperature to provide a polyamide acid in solution. It was noted that there was no initial drop in solution viscosity in this instance as in Method 4.

The following Table I shows the proportions in parts per hundred of polyamic acid compositions containing tertiary amine smoothness additive, there being shown the parts per hundred of benzophenone tetracarboxylic dianhydride (BPDA), methylene dianiline (MDA), cresol and additive, the percent smoothness additive being given as an approximate figure and based on the weight of the solvent.

TABLE I.—ENAMEL CONTAINING SMOOTHNESS ADDITIVE

| BPDA | MDA | Cresol | Smoothness additive | Percent smoothness additive |
|---|---|---|---|---|
| 12.85 | 8.15 | 78.20 | .80 | 1.0 |
| 12.76 | 8.09 | 77.50 | 1.65 | 2.0 |
| 12.75 | 8.08 | 77.40 | 1.87 | 2.3 |
| 12.70 | 8.05 | 77.20 | 2.05 | 2.5 |
| 12.66 | 8.02 | 77.00 | 2.32 | 3.0 |
| 12.52 | 7.94 | 76.10 | 3.44 | 4.4 |
| 12.46 | 7.90 | 75.60 | 4.04 | 5.0 |
| 12.26 | 7.79 | 74.50 | 5.45 | 7.0 |
| 12.25 | 7.76 | 74.40 | 5.72 | 7.3 |
| 12.16 | 7.72 | 73.90 | 6.22 | 8.0 |
| 11.97 | 7.60 | 72.80 | 7.63 | 10.0 |
| 11.54 | 7.33 | 70.06 | 11.07 | 15.0 |

It will be appreciated that as the solids content of the enamel is increased, the proportion of solvent and hence additive would normally be decreased. In some instances where the solids content is relatively high, the additive content of the solvent can be increased within the limits prescribed to obtain optimum coating ability.

The following Table II shows the proportions of material in parts per hundred used in the preparation of polyamide-containing 3 percent tertiary amine smoothness additive and ammonium acetate viscosity control material, the mole ratio of ammonium acetate to BPDA being shown along with the parts per hundred of the various ingredients, benzophenone tetracarboxylic dianhydride (BPDA), methylene dianiline (MDA), cresol, tertiary amine smoothness additive and ammonium acetate.

TABLE II.—ENAMEL CONTAINING 3% SMOOTHNESS ADDITIVE AND AMMONIUM ACETATE

| Mole ratio of ammonium acetate to BPDA | BPDA | MDA | Cresol | Smoothness additive | Ammonium acetate |
|---|---|---|---|---|---|
| 0.5/1 | 12.40 | 7.88 | 75.98 | 2.28 | 1.46 |
| 1.0/1 | 12.25 | 7.78 | 74.80 | 2.26 | 2.91 |
| 1.5/1 | 12.05 | 7.65 | 73.79 | 2.22 | 4.29 |
| 2.0/1 | 11.90 | 7.60 | 72.65 | 2.19 | 5.66 |

Shown in Table III below are the proportions of materials used in the preparation of a polyamic acid containing the indicated percentage of smoothness additive based on the weight of the cresol solvent and also containing ammonium acetate in the ratio of one mole of ammonium acetate to one mole of benzophenone tetracarboxylic dianhydride (BPDA).

TABLE III.—ENAMEL CONTAINING 1 TO 1 MOLE RATIO OF AMMONIUM ACETATE TO BPDA AND WITH SMOOTHNESS ADDITIVE

| BPDA | MDA | Cresol | Ammonium acetate | Smoothness additive | Percent smoothness additive |
|---|---|---|---|---|---|
| 12.40 | 7.77 | 76.20 | 3.05 | .76 | 1.0 |
| 12.05 | 7.64 | 73.66 | 2.95 | 3.70 | 5.0 |

Shown in Table IV below are the proportions of materials used in preparing a polyimide from benzophene tetracarboxylic dianhydride (BPDA) and meta-phenylene diamine (MPDA) using cresol as the solvent and a smoothness additive, the latter in the proportion used and also expressed as a percent of the cresol solvent.

TABLE IV.—ENAMEL CONTAINING SMOOTHNESS ADDITIVE

| BPDA | MPDA | Cresol | Smoothness additive | Percent smoothness additive |
|---|---|---|---|---|
| 15.00 | 5.20 | 74.03 | 5.77 | 7.0 |
| 14.75 | 5.10 | 72.61 | 7.54 | 10.0 |

Various wire enamels were prepared as shown in Table V below and applied to copper wire 0.0403 inch in diameter to a total thickness of 2.2 mils in six coating passes, the coatings being cured in a 5 foot high vertical wire tower having a top temperature of 400° C. and a bottom temperature of 135° C., the speed of the wire through the tower being about 6 feet per minute. The various wire enamel compositions so applied to copper wire provided smooth and uniform electrical insulating and protective coatings. In the first column is shown the weight percent of smoothness additive identified base on the weight of the solvent. Shown in column 2, where appropriate, is the amount of viscosity control material, the amount being expressed as the mole ratio of ammonium acetate to benzophenone tetracarboxylic dianhydride. Indicated in the third column is the method of preparation as described above.

TABLE V
N-Methyldiethanolamine Diacetate [1]

| Percent smoothness additive | Ammonium acetate | Method of synthesis |
|---|---|---|
| 2 | | 1 |
| 3 | | 1 |
| 3 | 1/1 | 2 |
| 3 | 1/1 | 2 |
| 3 | | 3 |
| 3 | | 3 |
| *3 | 1/1 | 2 |
| 3 | | 2 |
| 3 | 1/1 | 2 |
| 3 | 1/1 | 4 |
| 3 | 2/1 | 4 |
| 3 | 1.5/1 | 4 |
| 3 | 1/1 | 5 |
| 3 | 2/1 | 5 |
| 3 | 1.5/1 | 5 |
| 3 | 0.5/1 | 4 |
| 3 | 1/1 | 5 |
| 5 | | 6 |
| 5 | | 7 |
| 5 | | 3 |
| 7 | | 3 |
| 8 | | 3 |
| 10 | | 3 |
| 10 | | 3 |
| 10 | | 7 |

| N-Methyldiethanolamine | | |
|---|---|---|
| 1 | 1/1 | 2 |
| 2.5 | | 1 |
| 3 | 1/1 | 2 |
| 3 | 1/1 | 2 |
| 3 | | 5 |
| 5 | | 1 |
| 5 | | 1 |
| 5 | 1/1 | 2 |
| 5 | | 3 |
| 10 | | 1 |
| 15 | | 1 |

| N-Acetoxyisopropylmorpholine | | |
|---|---|---|
| 3 | 1/1 | 5 |
| 5 | 1/1 | 2 |

TABLE V—Continued

| Percent smoothness additive | Ammonium acetate | Method of synthesis |
|---|---|---|
| N-Hydroxyisopropylmorpholine | | |
| 3 | 1/1 | 5 |
| 5 | | 1 |
| Triethanolamine | | |
| 2.3 | | 3 |
| 7.3 | | 6 |
| N,N-Phenylmethylethanolamine | | |
| 3 | 1/1 | 5 |
| N-Butyldiethanolamine | | |
| 2.5 | | 1 |
| 3 | 1/1 | 5 |
| 5 | | 1 |
| N-t-Butyldiethanolamine | | |
| 5 | | 1 |
| N-Phenyldiethanolamine Diacetate | | |
| 3 | 1/1 | 5 |
| 5 | 1/1 | 2 |
| N-Phenyldiethanolamine | | |
| 5 | 1/1 | 2 |
| N,N-Phenylethylethanolamine | | |
| 3 | 1/1 | 5 |

$$\text{1 Denotes } CH_3-N-(CH_2-CH_2-O-\overset{O}{\underset{\|}{C}}-CH_3)_2.$$

The following illustrates a typical one of the above example.

Referring to the asterisked example in Table V, it will be noted that the polymer was prepared according to Method 2 described above and that the percent smoothness additive is 3 percent based on the weight of the solvent. Since, as shown in Table V, the ammonium acetate to BPDA ratio is 1/1, one can refer to Table II covering smoothness additives in 3 percent by weight amounts based on the weight of the solvent and ammonium acetate and opposite the 1/1 mole ratio of ammonium acetate to BPDA read that the particular enamel consists of by weight 12.25 parts BPDA, 7.78 parts MDA, 7.480 parts cresol, 2.26 parts smoothness additive and 2.91 parts ammonium acetate. When this particular enamel was coated on 0.0403 inch diameter copper wire in a vertical electrically heated 5 foot high wire tower at wire speeds of 6 feet and 8 feet per minute and on a vertical electrically heated 12 foot wire tower at speeds of 25 feet per minute, and finally on a vertical gas-fired wire tower at wire speeds of 25 feet to 35 feet per minute, the resultant enameled wire was in each case smooth, flexible and tough with a cut-through of over 500° C. with builds varying from 2.4 to 3.5 mils. Physical, chemical and electrical properties were good.

The following example also illustrates the preparation of a wire enamel according to the present invention.

To a solution of 7.95 parts of methylene dianiline (MDA), 2.95 parts of ammonium acetate and 38.30 parts of cresol at 60° C., there was added a solution of 12.50 parts of benzophenone dianhydride (BPDA) and 38.30 parts of cresol with stirring under a blanket of nitrogen. Three percent of N-methyldiethanolamine diacetate based on the weight of the solvent was added with stirring. A sample of the enamel when coated on 0.0403 inch diameter copper wire to a total build of 2.3 mils at a wire speed of 8 feet per minute in a five-foot vertical tower having a bottom temperature of 150° C. and a top temperature of 400° C. had a smooth, unblemished surface, a flexibility of 25 percent×2X and other desirable characteristics including good snap elongation, cut-through and other electrical insulating and protective properties.

It will be realized, of course, that mixtures of dianhydrides as well as mixtures of diamines, or both, may be utilized in the preparation of the present polyimide compositions. For example, pyromellitic dianhydride (PMDA)

can be used in conjunction with benzophenone tetracarboxylic dianhydride (BPDA) in preparing useful compositions. For example, a solution of 6.77 parts of benzophenone tetracarboxylic dianhydride (BPDA) and 4.58 parts pyromellitic dianhydride (PMDA) with 4.3 parts of N-methyldiethanolamine diacetate as a smoothness additive and 37.90 parts of cresol was added to a solution of 37.90 parts of cresol and 8.6 parts of methylene dianiline and reacted, the percent of smoothness additive based on the solvent being 5.5 percent. When 0.0403 inch diameter copper wire was coated with the resultant enamel to a total thickness of 2 mils and cured in a five-foot wire tower as above, the coating so prepared was satisfactory from the smoothness point of view. The cut-through of the coating was 540° C. and the snap elongation and other usual physical characteristics were satisfactory.

This example illustrates the application of the present invention to polyamide amide-acid type materials. To 1200 g. of cresol and 70 g. of ammonium acetate there was added slowly over a period of about 10 minutes at room temperature 300 g. of a polyamic acid known as Amoco AI-10 derived from the reaction of the monoacid chloride of trimellitic anhydride and methylene dianiline. Stirring was continued for approximately six hours and the contents allowed to remain for about one day at room temperature. Then 5 g. of N-methyldiethanolamine diacetate or about 3 percent based on the solvent weight was added with stirring to a 200-gram portion of the reacted solution. When the solution was coated on copper wire and cured as above, the resulting wire surface was rough whereas that with the smoothness additive provided a smooth, continuous surface having salutary electrical insulating properties. There was no loss of physical properties by addition of the smoothness additive, and the flexibility of the enameled wire with additive was 25%+2X.

This example illustrates the application of the present invention using as the anhydride, ethylene bis(anhydrotrimellitate). To 761 g. of phenol and 1410 g. of cresol there was added 41.03 g. of the above anhydride, 128.88 g. of benzophenone dianhydride (BPDA) and 122.76 g. of methylene dianiline (MDA), the contents being stirred under a blanket of nitrogen and heated to 90° C. over a period of one-half hour until an amber colored solution resulted. There was added to a cooled 200-gram portion of the above solution with stirring 5 g. of N-methyldiethanolamine diacetate or about 3 percent based on the solvent weight, the solution so treated being used to coat a copper wire as above to provide a smooth, continuous surface having good electrical insulating properties, a cut-through of about 340° C., and a flexibility of 25%+2X, as well as satisfactory snap elongation. On the other hand, when a sample of the solution not treated with a smoothness additive was used to coat a wire as above, a rough enameled surface not useful for electrical insulating properties resulted.

This example illustrates the practice of the present invention in connection with a polyamide amide-acid type material. A polyamic acid, more specifically a polyamide amide-acid, was prepared by reacting together 0.73 mole of methylene dianiline (MDA) and 0.364 mole azeleic acid in 200 g. of cresol, the mixture being stirred and heated at reflux from 205° C. to 220° C. under nitrogen for about four hours, water formed passing into a trap provided. The reaction mixture was then diluted with cresol and cooled to 90° C. To the solution of polyamide diamine so prepared, there was added a solution containing 116 g. of benzophenone dianhydride (BPDA) in 920 g. of cresol, the reactant mixture being stirred for 5 minutes at 90° C. and then cooled to 50° C. The resulting polyamide amide-acid solution containing 17.8 percent solids was a clear, viscous material.

When the above polyamide amide-acid solution was coated as such on a copper wire as above, a rough surface resulted. However, when there was added to the polyamide amide-acid solution so prepared N-methyldiethanolamine diacetate in the amount of 5 g. to 200 g. of solution, or about 3 percent in the solvent weight and used to coat copper wire as above, the resulting enameled surface was smooth and acceptable as electrical insulation. The flexibility was 25%+1X and the cut-through about 380° C.

It is to be understood that the present invention is specific to the particular present tertiary amine additives having hydroxyl or acetate groups or both. For example, when pyridine was used in lieu of the present additives, the shelf life of the resulting material was very poor as compared to the shelf life of up to fifty days or more for the present materials. Likewise, when other tertiary amines not falling within the present description were used, unsatisfactory coatings were obtained. Among the materials so tested and found wanting were N,N-dimethylaniline, N,N-dimethylbenzylamine, triethylamine, triethylene diamine, N-ethylmorpholine, N-methylmorpholine, N,N,N,N-tetramethyl-1,3-butanediamine, hexamethylenetetramine, dimethylaminomethylphenol, tridimethylaminomethylphenol, N-cyclohexylpiperidine, and N,N-dimethylcyclohexylamine.

Shown in Table VI below are listed various of the above type unsaturated addition materials along with their weight percent based on the solvent weight and the reason for failure of these materials.

TABLE VI

| Tertiary amine | Weight/percent | Reason for failure |
|---|---|---|
| Pyridine | 1-8 | Rough surface and extremely poor shelf life. |
| N,N-dimethylaniline | 6 | Do. |
| N,N-dimethylbenzylamine | 7 | Severe blistering. |
| Triethylamine | 5 | Precipitation of polymer on wire during enameling process. |
| Triethylene diamine | 5 | Severe blistering. |
| N-ethylmorpholine | 5 | Do. |
| N-methylmorpholine | 3-5 | Do. |
| N,N,N,N-tetramethyl-1,3-butanediamine | 5 | Rough surface and severe blistering. |
| Hexamethylenetetramine | 2 | Rough surface. |
| Dimethylaminomethylphenol | 5 | Severe blistering. |
| Tridimethylaminomethylphenol | 5 | Rough and severe blistering. |
| N-cyclohexylpiperidine | 3 | Severe blistering. |
| N,N-dimethylcyclohexylamine | 3 | Do. |

There are provided, then, by the present invention coating materials capable of providing smooth surfaces on electrical conductors and other structures, which surfaces are also characterized by other desirable properties.

What we claim as new and desire to secure by Letters Patent of the United States is:

1. A coating composition comprising (a) a polyamic acid, (b) solvent selected from phenol and cresol and mixtures thereof, and (c) an additive selected from tertiary amine material having Formula II and Formula III and mixtures thereof, said tertiary amine material having a boiling point of at least 180° C.

2. A composition as in claim 1 wherein said polyamic acid is derived from benzophenone dianhydride.

3. A composition as in claim 1 wherein said polyamic acid is derived from a mixture of benzophenone dianhydride and pyromellitic dianhydride.

4. A composition as in claim 1 wherein said polyamic acid is derived from methylene dianiline.

5. A composition as in claim 1 wherein said polyamic acid is derived from meta-phenylene diamine.

6. A composition as in claim 1 wherein said additive is selected from the group consisting of N-methyl-diethanolamine, N - acetoxyisopropyl morpholine, N - hydroxyisopropyl morpholine, triethanolamine, N,N - phenylmethylethanolamine, N - t - butyldiethanolamine, N - butyldiethanolamine, N - phenyldiethanolamine, and N,N-phenylethylethanolamine and acetates thereof, and mixtures thereof.

7. A composition as in claim 1 which contains as an additional ingredient a material of the formula

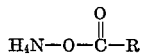

where R is a monovalent hydrocarbon radical selected from alkyl, aryl, alkaryl and aralkyl radicals.

References Cited

UNITED STATES PATENTS 3,242,136  3/1966  Endrey.
3,260,691  7/1966  Lavin.
3,277,043  10/1966  Holub.

MORRIS LIEBMAN, Primary Examiner

P. R. MICHL, Assistant Examiner

U.S. Cl. X.R.

260—32.6